US012646919B2

(12) United States Patent
Khan

(10) Patent No.: US 12,646,919 B2
(45) Date of Patent: Jun. 2, 2026

(54) ENERGY REDUCTION MAINTENANCE SWITCHES WITH ACTIVATION ALERT

(71) Applicant: SAUDI ARABIAN OIL COMPANY, Dhahran (SA)

(72) Inventor: Md Abid Khan, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 218 days.

(21) Appl. No.: 18/414,829

(22) Filed: Jan. 17, 2024

(65) Prior Publication Data

US 2025/0233403 A1     Jul. 17, 2025

(51) Int. Cl.
H02H 3/00          (2006.01)
H02H 1/00          (2006.01)
H02H 3/04          (2006.01)
H02H 3/06          (2006.01)

(52) U.S. Cl.
CPC ............ H02H 3/04 (2013.01); H02H 1/0015 (2013.01); H02H 3/066 (2013.01)

(58) Field of Classification Search
None
See application file for complete search history.

(56) References Cited

U.S. PATENT DOCUMENTS

| | | | |
|---|---|---|---|
| 10,475,612 | B2 | 11/2019 | Zhang et al. |
| 11,469,591 | B2 * | 10/2022 | Castillo .................. H01H 71/12 |
| 2010/0265629 | A1 | 10/2010 | Beckerman |
| 2016/0225561 | A1 | 8/2016 | Fukumoto et al. |
| 2023/0097925 | A1 * | 3/2023 | Sarkis ...................... H02B 1/38 |
| | | | 200/50.21 |
| 2024/0030695 | A1 * | 1/2024 | Khan ..................... H02H 3/006 |

OTHER PUBLICATIONS

Non-Final Office Action issued in related U.S. Appl. No. 18/476,153 dated Sep. 24, 2025 (7 pages).

* cited by examiner

*Primary Examiner* — Stephen W Jackson
(74) *Attorney, Agent, or Firm* — Osha Bergman Watanabe & Burton LLP

(57)          ABSTRACT

An Energy Reducing Maintenance Switch (ERMS) connected to an electrical circuit includes: a switch that activates the ERMS upon being closed or turned-on; a normally-open first contact that closes to activate an instantaneous trip setting of a relay upon activation of the ERMS; and a second contact. The instantaneous trip controls an arc flash in the electrical circuit, and the activated instantaneous trip setting of the relay reduces time of the arc flash in the electrical circuit. Upon activation of the ERMS, the second contact closes to initiate ERMS activation alert in two or more forms.

19 Claims, 8 Drawing Sheets

S 435 — A second light on the switchgear enclosure?

No →

Yes ↓

S 440 — Turn on the second light

S 445 — An alarm on an annunciator panel?

No →

Yes ↓

S 450 — Turn on the alarm

S 455 — Switch OFF detected?

No ←

Yes ↓

S 460 — Restore the instantaneous trip setting to an original setting upon detection of the signal that causes deactivation of the ERMS S 470 — Open the first contact, the second contact End

ENERGY REDUCTION MAINTENANCE SWITCHES WITH ACTIVATION ALERT

BACKGROUND

The protection of human lives from an arc flash during electrical work is recognized as a pressing issue and a challenge. The electrical energy discharged from the line side of incomer breakers of a 480-volt switchgear has taken lives of electrical workers. As a counteractive measure, breakers and/or fuses are installed in an upstream high voltage system (4.16 kV or higher) to clear electrical faults in a relevant portion of a system. However, due to slow fault clearance, the energy of faults can rise beyond the level of protection (rating) of personnel protective equipment (PPE). Accordingly, Energy Reduction Maintenance Switches or Energy Reducing Maintenance Switch (ERMS) are used in upstream high-voltage switchgears. Connecting and activating ERMS to a high-voltage electrical circuit reduces an arc flash incident energy in the electrical circuit. When ERMS is switched "ON" (i.e., is activated) prior to and while performing maintenance activities, ERMS increases protection against a fault because the activation modifies an instantaneous trip setting of a relay used in the electrical circuit and limits the arc flash incident energy, for example affecting a bus of a switchgear. After the maintenance activities are completed, ERMS needs to be switched back to an open position (i.e., deactivated) to restore the original setting of the relay. In an instance in which the switchgear enclosure 102 is located far from a work site, the notice of ERMS activation by the illumination of the first light is hardly perceptible to workers at the work site. Furthermore, the notice is hard to detect with a diminutive panel indicator light provided on a front panel of switchgear enclosures. Accordingly, the conventional ERMS complicates the maintenance of switchgears and hurts the electrical circuit operation.

The human intervention requirement, i.e., manual switching of ERMS, makes the operation of ERMS vulnerable to omissions and errors. In addition, the ON/OFF switch of ERMS is often installed in an upstream high voltage switchgear that is quite far from a work site and is not visible. Therefore, any abnormality that occurs in relation to the operation of ERMS may be difficult to be detected or corrected. Thus, an operators' failure to deactivate ERMS promptly after the completion of the work has complicated the effectiveness of ERMS and the integrity of electrical systems.

SUMMARY

This summary is provided to introduce a selection of concepts that are further described below in the detailed description. This summary is not intended to identify key or essential features of the claimed subject matter, nor it is intended to be used as an aid in limiting the scope of the claimed subject matter.

This disclosure presents, in accordance with one or more embodiments, an ERMS connected to an electrical circuit, including: a switch that activates the ERMS upon being closed or turned-on; a normally-open first contact that closes to activate an instantaneous trip setting of a relay upon activation of the ERMS; and a second contact. The instantaneous trip controls an arc flash in the electrical circuit, and the activated instantaneous trip setting of the relay reduces time of the arc flash in the electrical circuit. Upon activation of the ERMS, the second contact closes to initiate ERMS activation alert in two or more forms.

In another aspect, this disclosure presents, in accordance with one or more embodiments, a method for operating an ERMS connected to an electrical circuit, including: detecting a signal that a switch of the ERMS is on; closing a first contact of the ERMS, upon detection of the signal that the switch is on; activating an instantaneous trip setting of a relay upon closing of the first contact; closing a second contact of the ERMS, upon detection of the signal that the switch is on; and initiating ERMS activation alert in two or more forms, upon closing of the second contact. The instantaneous trip is set by the relay to control an arc flash. The activated instantaneous trip setting reduces time to contain the arc flash in the electrical circuit.

In another aspect, this disclosure presents, in accordance with one or more embodiments, a non-transitory computer readable medium (CRM) storing instructions for performing an operation of an ERMS connected to an electrical circuit. The operation includes: detecting a signal that a switch of the ERMS is on; closing a first contact of the ERMS, upon detection of the signal that the switch is on; activating an instantaneous trip setting of a relay upon closing of the first contact; closing a second contact of the ERMS, upon detection of the signal that the switch is on; and initiating ERMS activation alert in two or more forms, upon closing of the second contact. The instantaneous trip is set by the relay to control an arc flash. The activated instantaneous trip setting reduces time to contain the arc flash in the electrical circuit.

Other aspects and advantages of the invention will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the disclosure, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, throughout the disclosure, "or" is interpreted as "and/or," unless stated otherwise.

The term "contact" may mean a "switch," a "connecting point," a "connector," as well as a component(s) in a relay, a breaker and the like that reversibly connects or disconnects an electrical conductive path and/or neighboring components in an electrical circuit.

Embodiments disclosed herein describe an ERMS with activation alert that can reduce human errors in connection with operation of an electrical circuit that requires implementation of the ERMS. Specifically, work on the electrical circuit such as a maintenance work on a switchgear, may require utilization of the ERMS to support safety of workers against arc flash or other fault incidents. The acceleration of fault containment with lowered trip settings of a relay is a mandatory safety maneuver to be affected in the electrical circuit. The ERMS activates an instantaneous trip setting of a relay and prioritizes immediate containment of an arc flash, an electrical fault, a short circuit, a high load, and/or ripples. As such, while the ERMS activation is enforced, normal protective measures and electrical power distribution is interrupted. Once the work is completed, the ERMS must be deactivated to restore the carefully-selected initial protective measures that achieve the balance between safety and functionality. Existing conventional ERMS is known to be error-prone because the conventional ERMS relies on human maneuvers. According to one or more embodiments disclosed herein, an ERMS with fail-safe mechanisms is introduced. A method for operating the ERMS that prevents human errors, and a computer-readable medium that executes instructions for operating the ERMS incorporates activation alert as a workable solution.

Figure 1A:
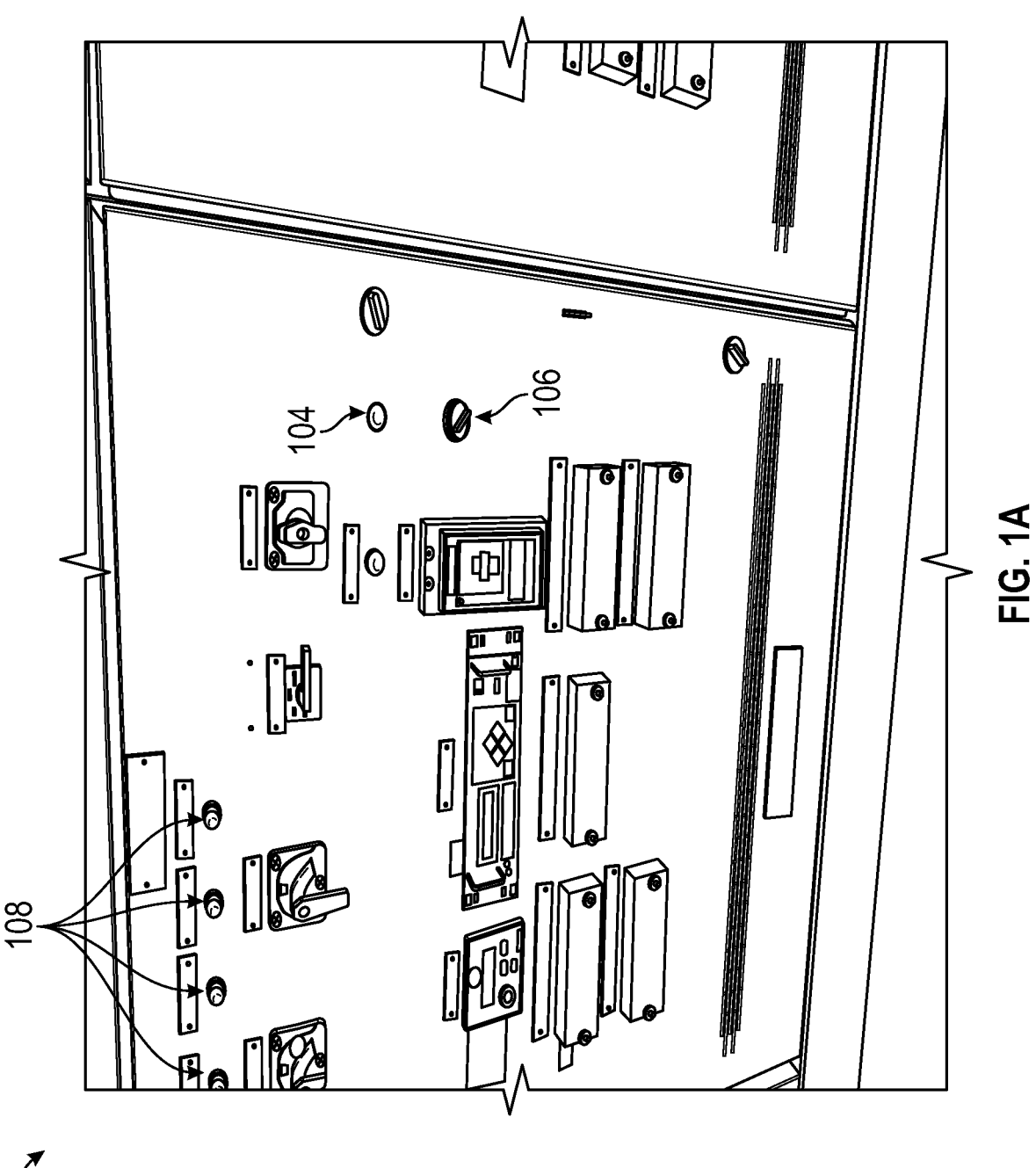
FIG. 1A shows a perspective view of a front panel of a conventional ERMS.

Referring to FIG. 1A, a perspective view of one conventional ERMS 202 is shown. As shown in FIG. 1A, as interface of the ERMS 202, a switch 106 may be installed on a front panel of a switchgear enclosure 102 that implements the ERMS 202. Specifically, the switchgear enclosure 102 may include the switch 106 to turn on or off the ERMS 202 alongside other switches and other panel indicator lights 108.

The switch 106 may be a type of toggle switch, or any other type of suitable switch. The ERMS 202 may be implemented with a switch 106 that activates the ERMS 202 upon being turned ON. When a worker performs work on the electrical circuit 200 and toggles the switch 106 to turn-on (e.g., by turning a selector switch), both the normally-open second contact 210 and the first contact 208 close to provide input signal via a connection 206 to the relay in the electrical circuit 200 to activate the instantaneous setting in the relay.

In one or more examples, the switchgear enclosure 102 may include a first light 104 to indicate a status of the ERMS 202. In such examples, the first light 104 may be a panel indicator light that is disposed on the front panel of the switchgear enclosure 102. As will be discussed later in relation to FIG. 2, the closing of the switch 106 provides a connection that supplies power to the first light 104. Thus, a worker may see illumination from the first light 104, upon turning ON the switch 106.

After work is completed, the ERMS 202 needs to be turned off. Once the worker manages to turn-off the switch 106, then both the first contact 208 and the second contact 210 become open. The opening of the first contact 208 and the normally-open second contact 210 bring the first light 104 back to the turned-off status. On the other hand, if the worker fails to turn off the ERMS 202, the ERMS 202 remains activated. In such situations, the first light 104 remains turned-on. Although the worker can confirm the continued activation of the ERMS 202 by seeing the first light 104 on, it requires attention.

In fact, the worker often moves away from the switchgear enclosure 102 and/or works on a component that is isolated from the front panel of the switchgear enclosure 102. In addition, the first light 104 may look similar to other panel indicator lights 108 as illustrated in FIG. 1A. The first light 104 and other panel indicator lights 108 may be located close to each other. Therefore, if the worker has low visual acuity, is distracted, or is located far from the first light 104, it is difficult for the worker to perceive illumination from the first light 104.

To realize an error-proof safety measure in the electrical circuit 200, the ERMS 202 may need to be implemented with vivid activation alert in two or more forms that prompts the worker to terminate the activation of the ERMS 202. For example, such activation alert may include a second light 112a, 112b, and an alarm 118 as an indicator of the activation of the ERMS 202b.

Figure 1C:
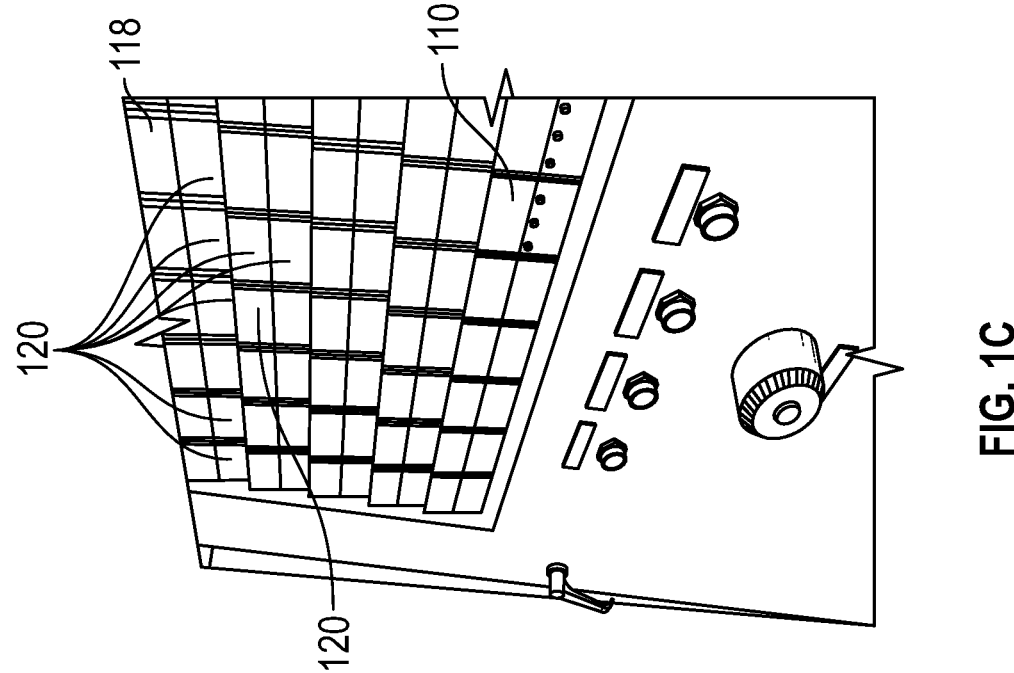
FIG. 1C shows a perspective view of an annunciator panel in accordance with one or more embodiments.
Figure 1B:
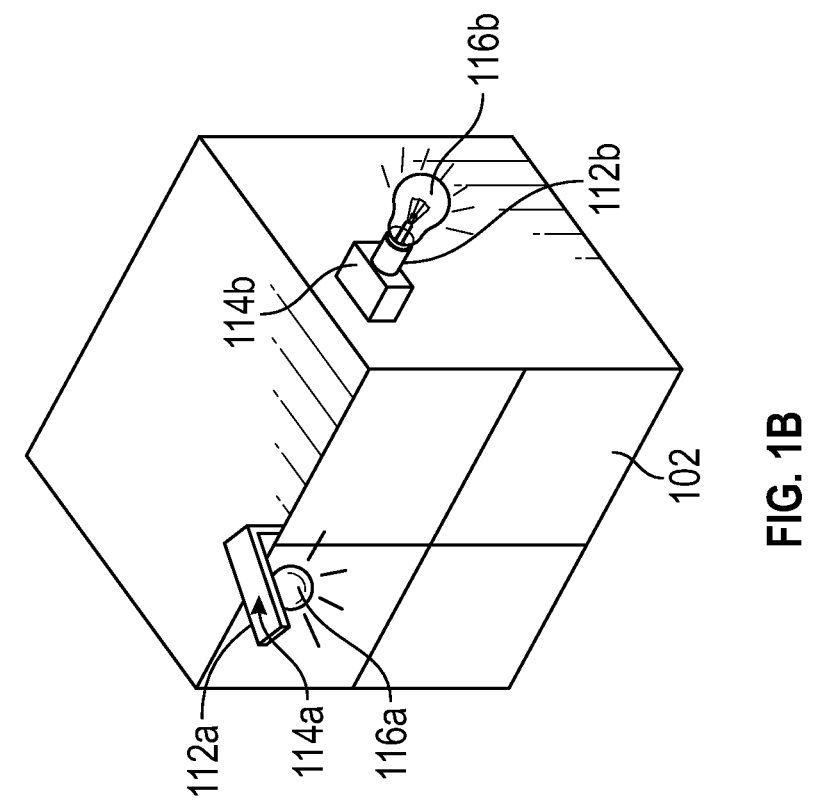
FIG. 1B shows a perspective view of a switchgear enclosure in accordance with one or more embodiments.

In FIG. 1B, a perspective view of the switchgear enclosure 102 in accordance with one or more embodiments is illustrated. The activation alert of the ERMS 202b may include not only the first light 104, but also the second light 112a or 112b that is disposed on the switchgear enclosure 102. The second light 112a or 112b may be disposed at a location on the switchgear enclosure 102 selected on top or a side of the switchgear enclosure 102 depending on the easiness for the operation of the plant. In one or more examples, the second light 112a or 112b includes a light bulb 116a, 116b greater than 10 mm in diameter. The second light 112a or 112b may include a light fixture 118a, 118b attached to the switchgear enclosure 102.

In one or more embodiments, the second light 112a or 112b may release a greater amount of illumination and provide illumination in a more visible form, such as blinking light. For example, the second light 112a or 112b may include a surface mounted diode LED spotlight bulb, or a chip on board LED bulb as the light bulb 116a or 116b. Using the customizable and energy-intensive lighting technologies such as a chip on board LED, the second light 112a or 112b may generate superior brightness-to-energy output.

The first light 104, usually a panel indicator light, is offered with a light bulb in a modest size. Unless the worker pays close attention to the first light 104 or information on the front panel, the worker may not detect the on-status of the first light 104. In contrast, the second light 112a or 112b may be distinguishable from other panel indicator lights 108, by its distinctive form, its installment position, and the degree of illumination. In such implementations, the on-status of the second light 112a or 112b is visible in a larger area than the immediate vicinity of the switchgear enclosure 102.

Accordingly, the ERMS 202b is configured to transmit an alert in a more visible and distinct format. The ERMS 202b is able to send a warning to the worker that the ERMS 202b is activated upon being turned-on, according to one or more embodiments.

Turning to FIG. 1C, a perspective view of the annunciator panel 110 in accordance with one or more embodiments is shown. Annunciator panels are centralized indicators of the status of equipment, subsystems, units, which may be included in an aircraft, mass transit network, industrial facility, commercial building and the like in which hazardous conditions need to be prevented and/or must be quickly resolved if one may arise. Annunciator panels built into power distribution systems serve the goal by warning trained engineers about any irregularity and abnormal events. Generally, annunciator panels include windows in a main panel, and a sound emitting device to draw the attention of responsible personnel. As seen in FIG. 1C, the annunciator panel 110 may include back-lit windows that specify the name of the component. Electrical signals indicative of an abnormal state in a power system are transmitted to a control system that turns on a relevant indicator light contained in a window. The indicator light flashes with or without an alarm sound (e.g., bell or horn). The indicator light may be disengaged when an operator turns off the alarm with a button after the alarm condition ends.

The activation alert in the ERMS 202b may include an alarm 118 that indicates the activated status of the ERMS 202b upon closing of the switch 106. In such implementations, the alarm 118 may be disposed on the annunciator panel 110. The alarm 118 may include an indicator light in a window as illustrated in FIG. 1C. The alarm 118 may be presented in a colored light to discriminate the ERMS activation alert from other alarms 120. For example, the alarm 118 may emit a blinking red light.

Optionally, the alarm 118 may accompany an alarm sound indicative of the ERMS activation via a sound device. The alarm sound may be a continuous beep or other types of alarm sound. The annunciator panel 110 has reset option to stop the audible alarm 118 while the indication light will be kept ON in the annunciator panel 110 unless the ERMS 202b is not turned back to OFF.

In such implementations, the status of the ERMS 202b is observable by seeing the annunciator panel 110. A supervising engineer may recognize the activation of the ERMS 202b and take actions to deactivate the ERMS 202b.

In other embodiments, the status of the electrical circuit 200 (upstream and downstream of the relevant switchgear enclosure 102) may be centrally monitored. The alarm 118, when included in the annunciator panel 110, may be reviewable by workers who oversee the electrical circuit 200.

Accordingly, in accordance with one or more embodiments, the ERMS 202b is configured to transmit the activation alert in a more-directed format to a broader range of workers who check the operation of the electrical circuit

200. The on/off status of the ERMS 202b may be immediately and plainly noticeable by every worker.

Figure 1D:
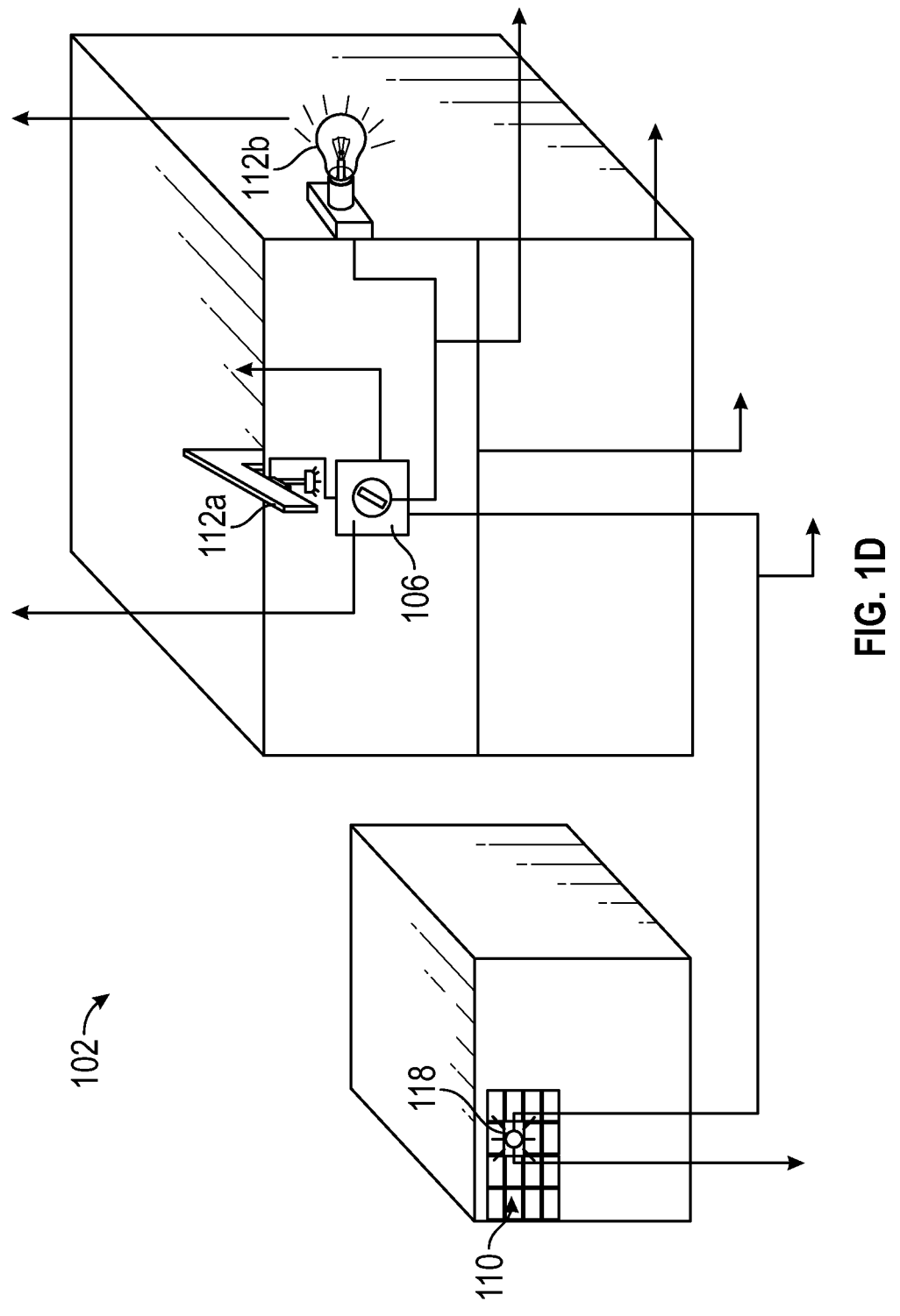
FIG. 1D shows a schematic diagram of ERMS in accordance with one or more embodiments.

FIG. 1D shows a schematic diagram of the ERMS 202b in accordance with one or more embodiments. As shown in FIG. 1D, the ERMS 202b may include user interface related to the ERMS 202b. The switch 106 disposed on the front panel of the switchgear enclosure 102 allows a worker to activate and deactivate the ERMS 202b.

The switch 106 may be connected to the first light 104, the second light 112a or 112b, and the alarm 118. Thus, once the switch 106 is ON, the first light 104, the second light 112a or 112b, and the alarm 118 may receive a signal from the switch 106 that the ERMS 202b is turned on. Accordingly, when the switch 106 is changed to the closed status ("ON"), the ERMS 202b may transmit instructions to the electrical circuit 200, and vice versa.

Figure 2:
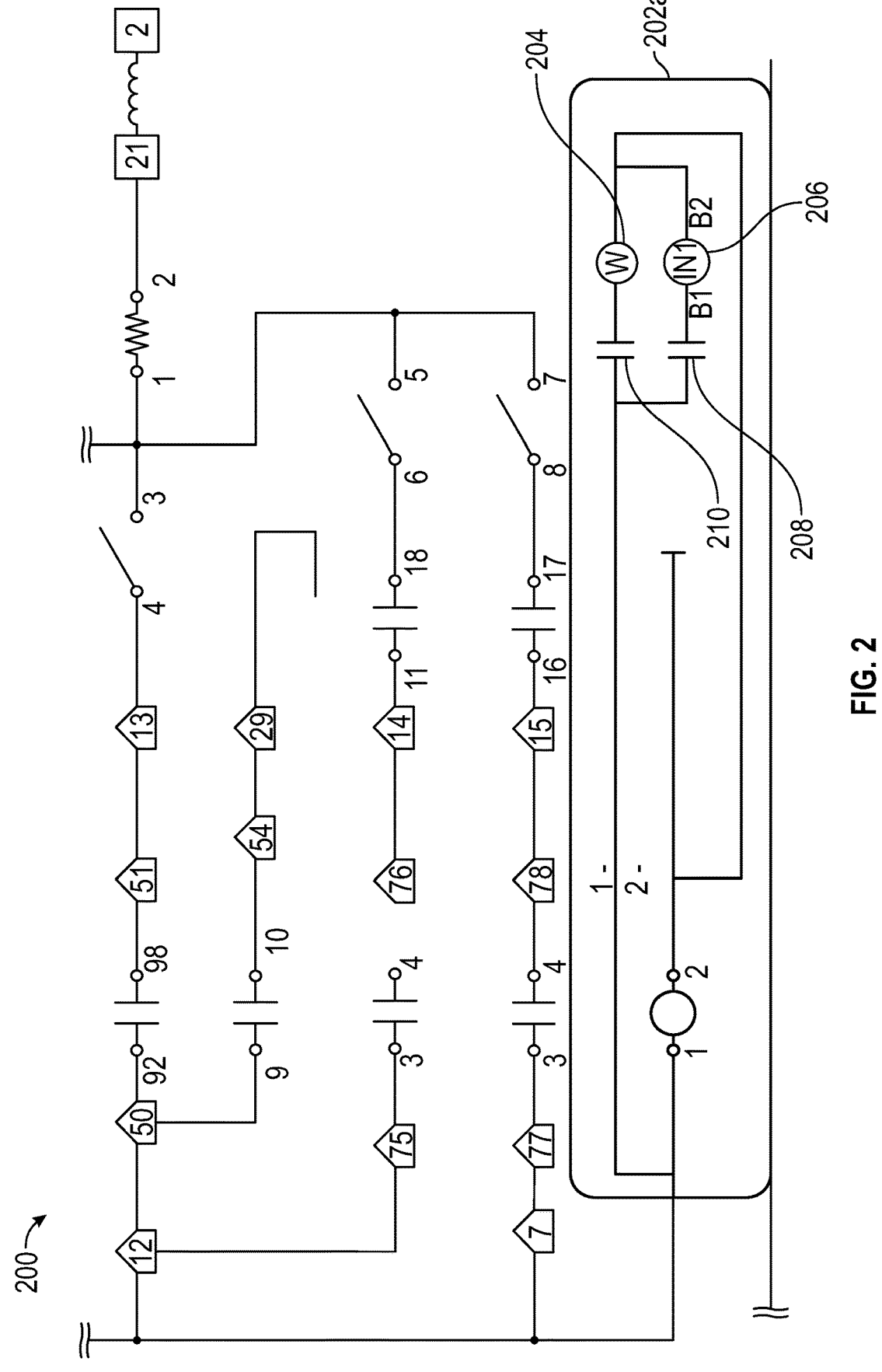
FIG. 2 shows a circuit diagram of a conventional ERMS in connection with a switchgear.

Turning to FIG. 2, a circuit diagram of the conventional ERMS 202a connected to the electrical circuit 200 is shown. As shown in FIG. 2, the ERMS 202a includes the first normally open contact 208 ("ERMS-2" in FIG. 2), the second contact 210 ("ERMS-1" in FIG. 2), the first light 204 ("W" in FIG. 2), and the input signal transmitted via a connection 206 ("IN1" in FIG. 2) to a relay.

Upon detection of the signal that the switch 106 is on, the ERMS 202a causes the normally-open first contact 208 of the ERMS 202a to close and provides a input signal via a connection 206 to the relay to turn on the instantaneous settings. Upon closing of the first contact 208 (activation of the ERMS 202a by the switch 106), and by the signal indicating the closing of the first contact 208, the ERMS 202a changes an instantaneous trip setting of the electrical circuit 200.

In the electrical circuit 200, as seen in many types of power systems, an instantaneous trip setting is controlled by the relay to contain an arc flash at a faster speed. If the instantaneous trip is set at a regular or stricter setting (i.e., a higher level of fault must be detected before protective measures contain the fault), a certain or longer period is required to isolate the fault. In those situations, the electrical circuit 200 endures an arc flash or other faults for the required period. On the other hand, with a lower trip setting, an arc flash and other faults will be removed in a shorter period. With ERMS activation, the instantaneous trip setting is activated to initiate at a faster rate. As a result, the damages from an arc flash or other faults are restricted to their minimum.

Upon detection of the signal that the switch 106 is on, the ERMS 202a causes the normally-open second contact 210 of the ERMS 202a to close. A signal indicating the closing of the second contact 210 may be transmitted via the closed second contact 210 to turn on ERMS activation alert, at least in one form.

In the conventional ERMS 202a, as shown in FIG. 2, the ERMS activation alert is provided only in one form, with the first light 204. As previously discussed, the first light 104 is usually a panel indicator light, whose light bulb is modest (2-8 mm) in size. The first light 104 does not provide enough illumination to a worker. Also, the first light 104 is not distinctive from other panel indicator lights 108. Therefore, to effectively capture attention from a worker and motivate the worker to turn off the ERMS 202a, the ERMS activation alert need to be offered in a more effective form, ideally two or more forms.

The ERMS 202a may be deactivated by turning off the switch 106 to open the first contact 208 and the second contact 210 again after a worker completes work on the electrical circuit 200. The ERMS 202a may determine whether the switch 106 is turned off. For example, by detecting electric current, the ERMS 202*a* may determine that the switch 106 is back to the off status.

As discussed above, the turning on the switch 106 causes the normally-open first contact 208 and the normally-open second contact 210 to close. Bringing the switch 106 back to the original off status, these changes are reversed. The original instantaneous trip setting of the relay is also restored because the input signal will be de-activated. The first light 104, the second light 112*a*, 112*b*, and the alarm 118 may be turned off upon turning off the switch 106.

Figure 3:
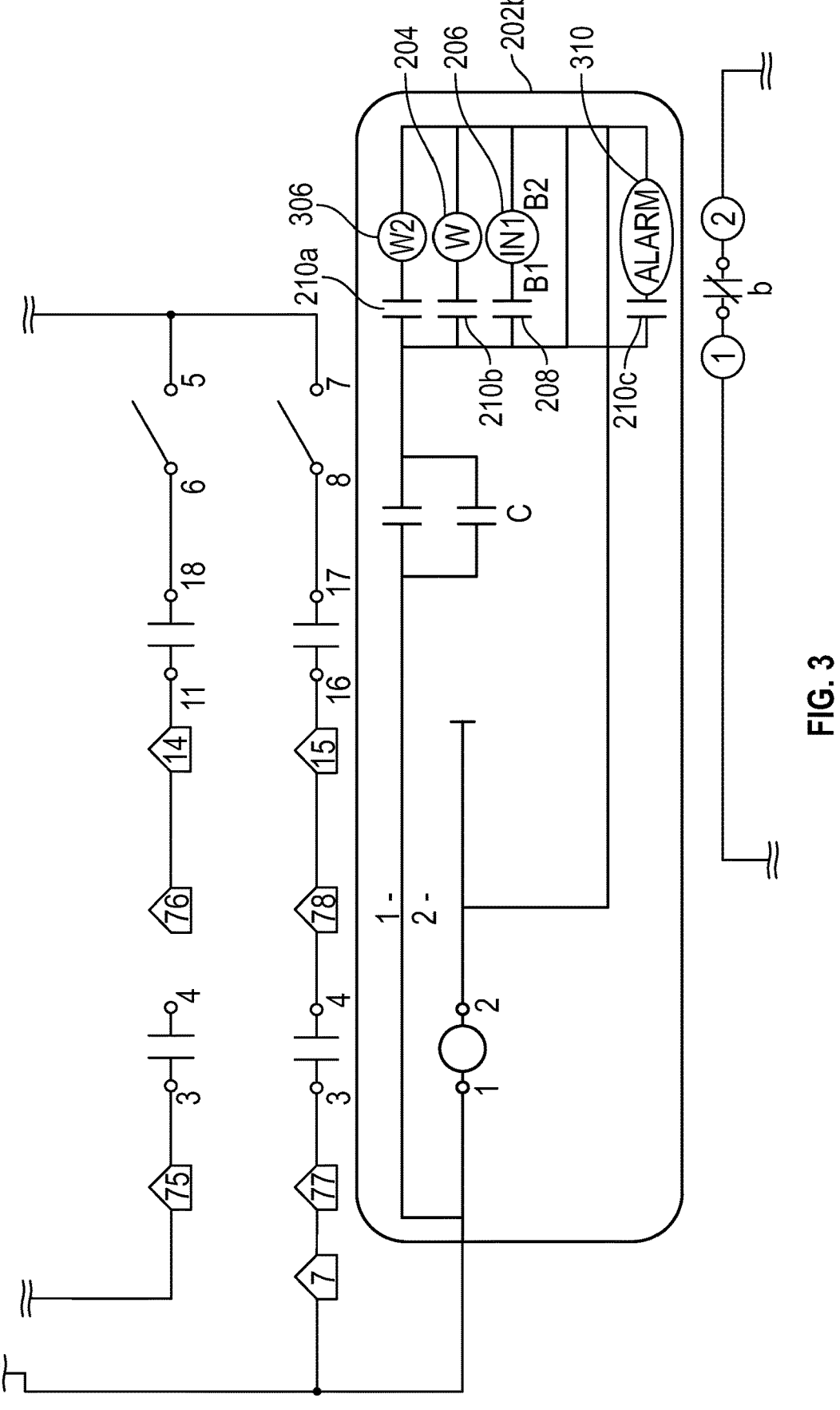
FIG. 3 shows a circuit diagram of an ERMS in accordance with one or more embodiments disclosed herein, in connection with a switchgear.

Referring to FIG. 3, a circuit diagram of the ERMS 202*b* is shown in accordance with one or more embodiments. As shown in FIG. 3, the ERMS 202*b* includes the switch 106 that is normally off. The ERMS 202*b* may further include the first contact 208 ("ERMS-2" in FIG. 3), the normally-open contact 210*b* ("ERMS-1" in FIG. 3), third contact 210*c* (ERMS-4 in FIG. 3), fourth contact 210*a* ("ERMS-3" in FIG. 3), the first light 104 ("W" in FIG. 3), and the input signal to the relay 206 ("IN1" in FIG. 3). The first contact 208, the normally-open contact 210*b*, third contact 210*c* and fourth contact 210*a* may be normally open and be closed upon closing of the switch 106. The ERMS 202*b* may also include the second light 112*a* or 112*b* ("W2") and the alarm 118 ("ALARM").

According to one or more embodiments, upon closing of the first contact 208 (activation of the ERMS 202*b* by the switch 106), a signal indicating the closing of the first contact 208 is transmitted, and the ERMS 202*b* activates an instantaneous trip setting of the electrical circuit 200.

According to the embodiments disclosed herein, the ERMS activation alert is provided in more than one forms, including the first light 204. For example, upon detection of the signal that the switch 106 is on, the ERMS 202*b* causes the normally-open contact 210*b* to close, and starts the ERMS activation alert, at least with the first light 204. Further, the ERMS 202*b* may cause the third contact 210*c*, and the fourth contact 210*a* to close (in addition to the normally-open contact 210*b*), and the ERMS activation alert may also be provided with the second light 306 and the alarm 310. In such implementations, contacts 208, 210*a*, 210*b*, 210*c* are a group of multiple contacts that are connected in parallel.

In one or more embodiments, upon completion of work on the electrical circuit 200, a worker sees the second light 112*a* or 112*b* disposed on the switchgear enclosure 102 and/or the alarm 118 disposed on the annunciator panel 110. The ERMS activation alert constantly and emphatically persuades workers to turn off the switch 106. When the switch 106 is turned off, a signal that the switch 106 is changed to cause all contacts (208, 210*a*, 210*b* and 210*c*) to the open status in one or more embodiments.

Upon detection of the signal that the switch 106 is off, the ERMS 202*b* causes the normally-open first contact 208 of the ERMS 202*b* to open and provides a signal via a connection 206 to the relay. Upon opening of the first contact 208 (deactivation of the ERMS 202*b* by the switch 106), and by the signal indicating the opening of the first contact 208, the ERMS 202*b* may restore the instantaneous trip setting of the relay to the original setting.

Additionally, the ERMS 202*b* causes the second contacts 210 of the ERMS 202*b* to open and provides a signal to turn off the ERMS activation alert. The opening of the second contacts 210*a*, 210*b*, 210*c* deactivates the first light 204, the second light 306, and the alarm 310, according to one or more embodiments. Alternatively, in situations where the switch 106 is connected to the first light 204, the second light

306, and the alarm 310 only via the second contacts 210*b*, 210*a*, and 210*c*, the opening of the second contacts 210*b*, 210*a*, and 210*c* deactivates the first light 204, the second light 306, and the alarm 310.

In one or more implementations, the ERMS 202*b* may operate on a test mode that checks connections between the ERMS 202*b* and the electrical circuit 200. For example, in the test mode, the ERMS 202*b* may check the connection between the switch 106 and the first contact 208 or the second contacts 210*b*, 210*a*, and 210*c*. Additionally, the connection 206 between the first contact 208 and the relay input, the connection between the normally-open contact 210*b* and the first light 204, the fourth contact 210*a* and the second light 306, the third contact 210*c* and the alarm 310 may be examined. The ERMS 202*b* may return a result of the testing via an interface (not shown in the FIG. 3).

In view of the above, the ERMS 202*b* herein disclosed achieves reliability in the electrical power distribution due to the greater illumination and visibility of the second light 112*a* or 112*b*, and the implementation of the ERMS activation alert into the alarm 118 of the annunciator panel 110. The ERMS 202*b* with activation alert according to one or more embodiments ensures that the ERMS 202*b* be turned off promptly and prevents complications and disturbances in the electrical circuit 200.

Figure 4A:
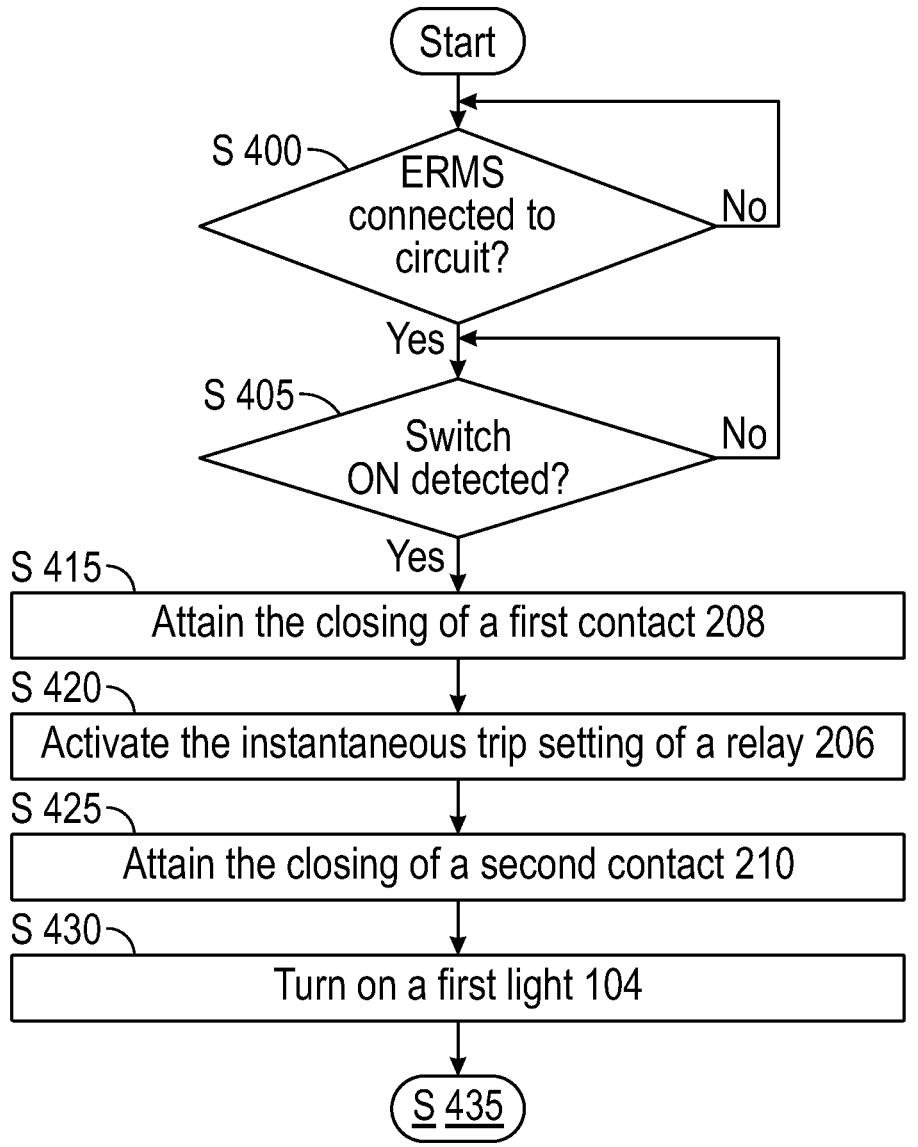
FIGS. 4A and 4B show flow charts for operation of the ERMS, in accordance with one or more embodiments disclosed herein.
Figure 4B:
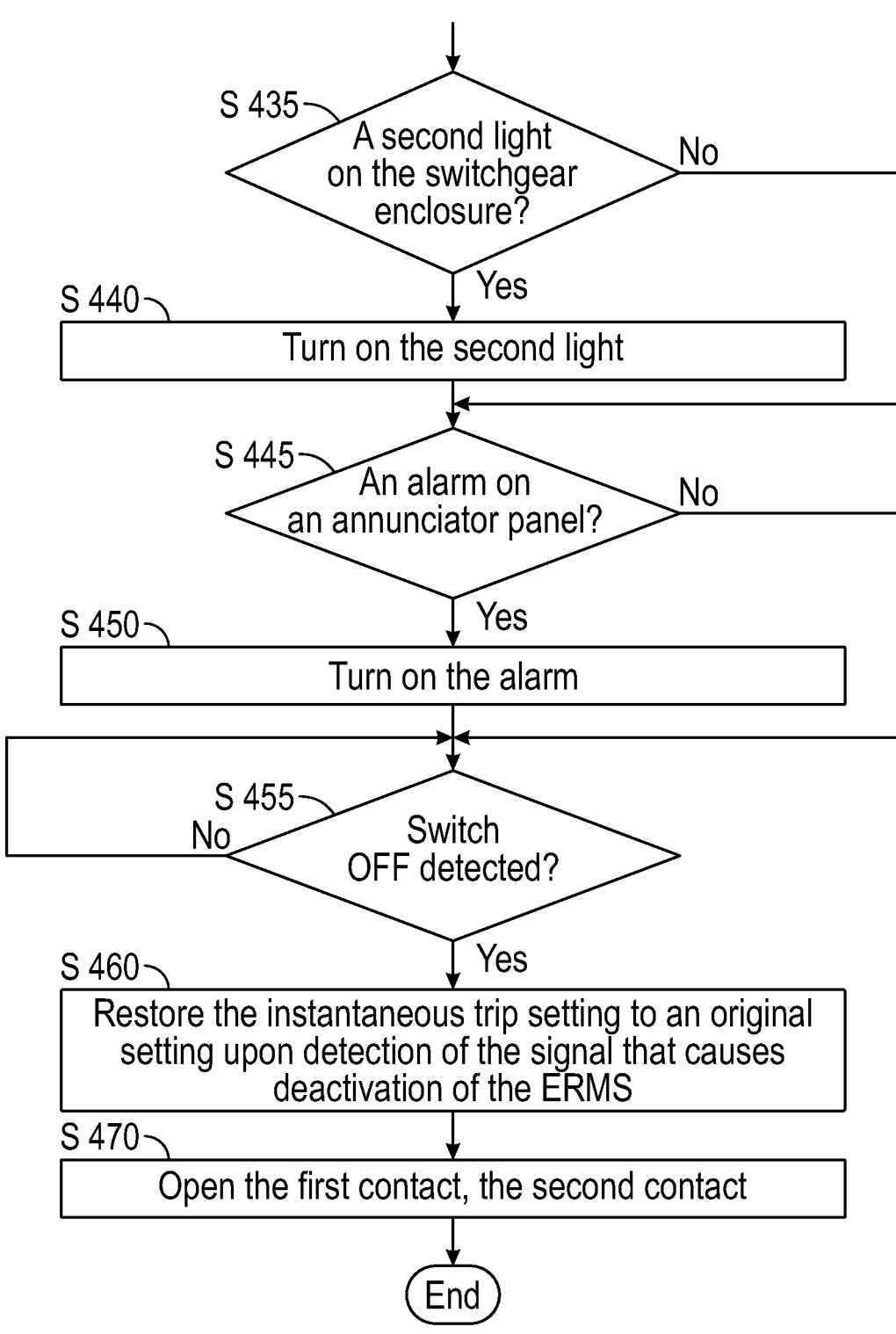

FIGS. 4A and 4B show flow charts for operation of the ERMS 202*b*, in accordance with one or more embodiments. In FIGS. 4A and 4B, the electrical circuit 200 requires the implementation of the ERMS 202*b* to alter the instantaneous trip setting of the relay prior to a work (e.g., switchgear maintenance) on the electrical circuit 200. At the same time, the ERMS activation involves the risk that a worker fails to restore the trip setting to the initial setting when the work is finished. As described above, the ERMS activation alert adopted in the ERMS 202*b* guards against human errors.

One or more of the individual steps shown in FIGS. 4A and 4B may be omitted, repeated, and/or performed in a different order than the order shown in FIGS. 4A and 4B. Accordingly, the scope of the disclosure should not be limited by the specific arrangement as depicted.

In one or more embodiments, any of the steps shown in FIGS. 4A and 4B may occur instantaneously or simultaneously with one another such that the time delays between any of these steps may be negligible in view of the operator.

At S400, the ERMS 202*b* checks its connectivity to the electrical circuit 200. In one or more embodiments, the ERMS 202*b* may include a test mode that checks the connection between the ERMS 202*b* and the electrical circuit 200. For example, the test mode may check the connection between the switch 106 and the first contact 208 or the second contacts 210*a*, 210*b*, and 210*c*. The test mode may check the connection between the first contact 208 and the relay, the connection between the normally-open contact 210*b* and the first light 204, the fourth contact 210*a* and the second light 306, the third contact 210*c* and the alarm 310. The ERMS 202*b* may indicate the result of the testing via an interface (not shown in the FIG. 4A). If the ERMS 202*b* is connected to the electrical circuit 200, the step proceeds to S405. If the ERMS 202*b* is not connected, the step returns to and repeats S400.

At S405, the ERMS 202*b* checks whether the switch 106 is turned on by detecting a signal from the switch 106. If the signal that the switch 106 is on is detected, the step proceeds to S410. If the signal is not detected, the step returns to and repeats S405.

At S415, the ERMS 202*b* may attain the closing of the first contact 208 that is normally open according to one or more embodiments. In one or more embodiments, the first contact 208 may be closed by electromagnetic effects of the coil that is energized. In other embodiments, the first contact 208 may be closed in accordance with an output signal from an embedded circuit that processes the signal from the switch 106.

At S420, upon closing of the normally-open first contact 208, the relay input signal will be transmitted to turn on the instantaneous trip setting of the relay, and the electrical circuit 200 may restrict faults more quickly with elevated function of the relay. With ERMS activation, the instantaneous trip is activated faster in case of a fault, including an arc flash. As a result, the arc flash incident energy is quickly controlled.

At S425, the ERMS 202b may attain the closing of the second contacts 210a, 210b, and 210c that are normally open. In one or more embodiments, the second contact 210 may be closed by turning on the switch 106. In other embodiments, the second contact 210 may be closed in accordance with an output signal from an embedded circuit that processes the signal from the switch 106.

At S430, upon closing of the second contact 210, the first light 104 may be turned on (i.e., lit) on the front panel of the switchgear enclosure 102. Upon the initiation of the ERMS activation alert with the first light 104, it is possible for a worker to confirm that ERMS 202b is, in fact, activated. The worker can start working, for example on the switchgear.

Turning to FIG. 4B, at S435, the ERMS 202b may determine whether the second light 112a or 112b is on the switchgear enclosure 102. The ERMS 202b may also determine whether the second light 112a or 112b is connected to the fourth contact 210a according to one or more embodiments. S435 may be performed as one process of the test mode as explained above. For example, the ERMS 202b may check whether the second light 112a or 112b is properly connected to the fourth contact 210a and whether the second light 112a or 112b is functional. If the second light 112a or 112b is connected to the fourth contact 210a, the step proceeds to S440. If the second light 112a or 112b is not connected to the fourth contact 210a, the step returns to and repeats S435.

Upon closing of the fourth contact 210a, the second light 112a or 112b may be turned on (i.e., lit) at S440. In such implementations, the second light 112a or 112b may provide a notice to a worker, distinguishable from other panel indicator lights 108. In one or more examples, the second light 112a or 112b includes a light bulb 116a or 116b greater than 10 mm and may be disposed in front of the switchgear enclosure 102. In one or more embodiments, the second light 112a or 112b may be disposed at a location on the switchgear enclosure 102 selected from a group consisting of: a top portion; and a sidewall. The second light 112a or 112b may provide greater illumination in a more visible form, such as blinking light. Accordingly, the ERMS 202b may remind the worker to turn off the switch 106 in a more visible and distinctive format, according to one or more embodiments.

The ERMS 202b may determine whether the alarm 118 is on the annunciator panel 110. The ERMS 202b may also determine whether alarm 118 is connected to the third contact 210c at S445, according to one or more embodiments. S445 may be performed as one process of the above-mentioned test mode. For example, the ERMS 202b may check whether the alarm 118 is properly connected to the third contact 210c and whether the alarm 118 operates normally. If the alarm 118 is on the annunciator panel 110 and connected to the third contact 210c, the step proceeds to S450. If the alarm 118 is not connected to the third contact 210c, the step returns to and repeats S445.

At S450, upon closing of the third contact 210c, the alarm 118 may be turned on (i.e., lit and emitted) according to one or more embodiments. The alarm 118 may include the panel indicator light disposed on the annunciator panel 110 and the alarm sound. The alarm 118 may be presented in a colored light that discriminates the ERMS activation alert from other alarms 120. For example, the alarm 118 may emit a blinking red light.

Optionally, the alarm 118 may accompany a sound indicative of the ERMS activation from the annunciator panel 110. The sound may be a continuous beep or any other types of alarm sound. There is an option to reset the continuous alarm (beep) in the annunciator panel 110 while the panel indicator light (display light) on the annunciator panel 110 will be turned off unless the ERMS 202b has been turned off.

At S455, the ERMS 202b may determine whether the switch 106 is turned off, according to one or more embodiments. For example, the ERMS 202b may determine that the switch 106 is back to the off status by detecting electric current. If the switch 106 is determined to be turned off, the step proceeds to S460. If the switch 106 has not been turned off, the step returns to and repeats S455.

At S460, upon determination that the switch 106 is back to the off status (i.e., turned off), the changes made by the ERMS 202b are reversed according to one or more embodiments. The instantaneous trip setting of the relay by deactivating input signal is restored to the original setting.

At S470, the ERMS 202b opens the first contact 208 and the third contact 210, to reverse the changes. For example, while the opening of the first contact 208 ends the change in the instantaneous trip setting of the relay by deactivating the input signal conveyed via a connection 206, the opening of the fourth contacts 210a and the third contact 210c, turns off the second light 112a or 112b and the alarm 118.

Examples of the above steps are described above with reference to FIGS. 1A, 1B, 1C, 1D, and 3.

One or more embodiments disclosed herein for operating the ERMS 202b, for example with reference to FIGS. 1A, 1B, 1C, 1D, and 3 may be implemented on virtually any type of computer system, regardless of the platform being used. The computer system may have programs or algorithms to control the functions/operations of the ERMS 202b described in the above embodiments. For example, the computer system may be one or more mobile devices (e.g., laptop computer, smart phone, personal digital assistant, tablet computer, or other mobile device), desktop computers, servers, an automation setup, blades in a server chassis, or any other type of computer system that includes at least the minimum processing power, memory, and input and output device(s) to perform one or more embodiments of the invention.

Figure 5:
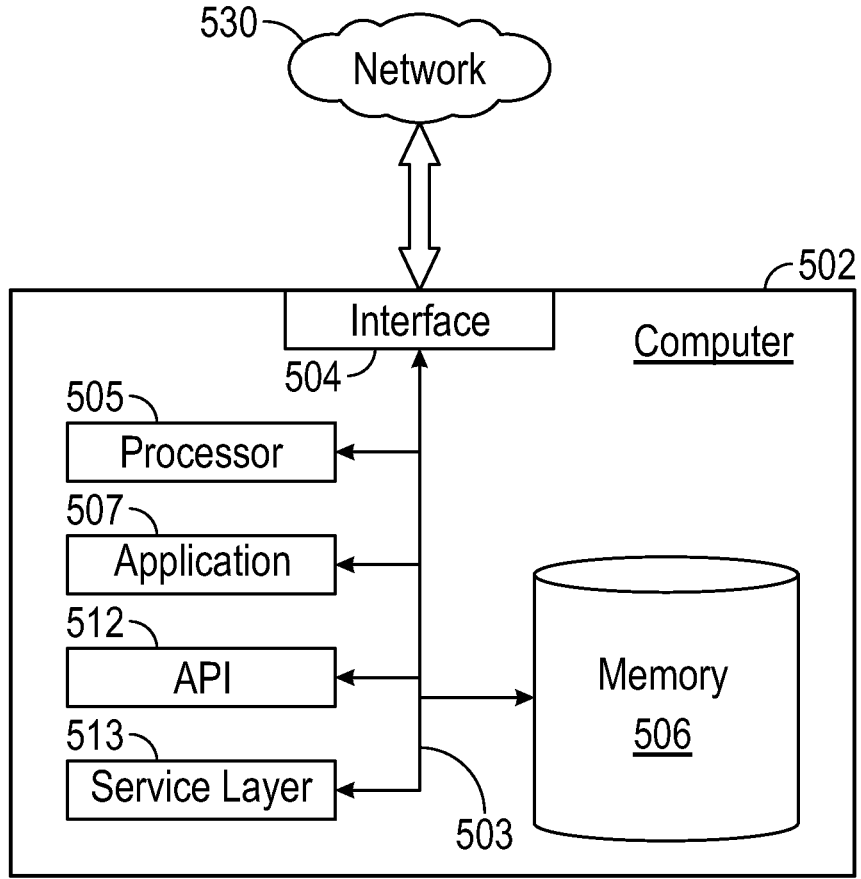
FIG. 5 shows a computer system, in accordance with one or more embodiments disclosed herein.

An example of the computer system is described with reference to FIG. 5, in accordance with one or more embodiments. FIG. 5 is a block diagram of a computer system used to provide computational functionalities associated with described algorithms, methods, functions, processes, flows, and procedures as described in the instant disclosure, according to an implementation. The illustrated computer (502) in the computer system is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In one or more implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to one or more implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In one or more implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513)). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer (513). Software services, such as those provided by the service layer (513), provide reusable, defined business functionalities through a defined interface. For example, the interface may be software written in JAVA, C++, Python, or other suitable language providing data in extensible markup language (XML) format or another suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or submodules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. In one example, memory (506) may store programs or algorithms for controlling operation of the ERMS 202 that is described in the above embodiments. More specifically, in this example, the programs or algorithms may control operation of the first light 104, the second light 112*a*, 112*b*, the alarm 118, the first contact 208, the second contact 210, a panel indicator light, and other embedded circuits. In one example, the first switch, the second switch, or the light indicator may be shown on a digital display, and the programs and algorithms may control the components of the ERMS based on an operator's action on the first or second switch. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, the application (507) can serve as one or more components, modules, applications, etc. In one example, the application (507) may include programs or algorithms for controlling operation of the ERMS that is described in the above embodiments. More specifically, in this example, the programs or algorithms may control operation of first light 104, the second light 112*a*, 112*b*, the alarm 118, the first contact 208, the second contact 210, a timer, a panel indicator light, and other embedded circuits. In one example, the first switch, the second switch, or the light indicator may be shown on a digital display, and the programs and algorithms may control the components of the ERMS based on an operator's action on the first or second switch. Further, although illustrated as a single application (507), the application (507) may be implemented as multiple applications (507) on the computer (502). In addition, although illustrated as integral to the computer (502), in alternative implementations, the application (507) can be external to the computer (502). In one example, the method described with reference to FIG. 5 may be implemented by the application (507).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502). Furthermore, in one or more embodiments, the computer (502) is a non-transitory computer readable medium (CRM).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. An Energy Reducing Maintenance Switch (ERMS) connected to an electrical circuit comprising:
   a switch that activates the ERMS upon being closed or turned-on;
   a normally-open first contact that closes to activate an instantaneous trip setting of a relay upon activation of the ERMS; and
   a second contact,
   wherein instantaneous trip controls an arc flash in the electrical circuit,
   wherein the activated instantaneous trip setting of the relay reduces time to contain the arc flash in the electrical circuit, and
   wherein, upon activation of the ERMS, the second contact closes to initiate ERMS activation alert in two or more forms.

2. The ERMS of claim 1, wherein
   the ERMS activation alert comprises: a first light disposed on a front panel of a switchgear enclosure; and a second light.

3. The ERMS of claim 2,
   wherein the ERMS activation alert further comprises: an alarm disposed on an annunciator panel and,
   wherein the annunciator panel indicates a status of the electrical circuit.

4. The ERMS of claim 2, wherein the second light blinks while turned on.

5. The ERMS of claim 2, wherein the second light is disposed on the switchgear enclosure at a location selected from a group consisting of: a top portion; and a sidewall.

6. The ERMS of claim 2, wherein the second light provides illumination greater than the first light upon being turned-on.

7. The ERMS of claim 2, wherein the second light comprises: a light bulb and a light fixture to the switchgear enclosure.

8. The ERMS of claim 1,
   wherein the ERMS is deactivated by turning off the switch, and wherein the ERMS restores the instantaneous trip setting to an original setting upon deactivation.

9. The ERMS of claim 8, wherein the ERMS opens the first contact and the second contact upon deactivation.

10. A method of operating an Energy Reducing Maintenance Switch (ERMS) connected to an electrical circuit, the method comprising:
   detecting a signal that a switch of the ERMS is on;
   closing a first contact of the ERMS, upon detection of the signal that the switch is on;
   activating an instantaneous trip setting of a relay upon closing of the first contact,
   closing a second contact of the ERMS, upon detection of the signal that the switch is on;
   initiating ERMS activation alert in two or more forms, upon closing of the second contact;
   wherein instantaneous trip is set by the relay to control an arc flash, and
   wherein the activated instantaneous trip setting reduces time to contain the arc flash in the electrical circuit.

11. The method of claim 10, wherein the ERMS activation alert comprises: a first light disposed on a front panel of a switchgear enclosure; and a second light.

12. The method of claim 11,
   wherein the ERMS activation alert further comprises: an alarm disposed on an annunciator panel and,
   wherein the annunciator panel indicates a status of the electrical circuit.

13. The method of claim 11, wherein the second light blinks while turned-on.

14. The method of claim 11, further comprising:
   detecting a signal that the switch is turned off;
   restoring the instantaneous trip setting to an original setting upon detection of the signal that the switch is turned off; and
   opening the first contact and the second contact.

15. A non-transitory computer readable medium (CRM) storing instructions for operation of an Energy Reducing Maintenance Switch (ERMS) connected to an electrical circuit, the operation comprising:
   detecting a signal that a switch of the ERMS is on;
   closing a first contact of the ERMS, upon detection of the signal that the switch is on;
   activating an instantaneous trip setting of a relay upon closing of the first contact;
   closing a second contact of the ERMS, upon detection of the signal that the switch is on; and
   initiating ERMS activation alert in two or more forms, upon closing of the second contact,
   wherein instantaneous trip is set by the relay to control an arc flash, and
   wherein the activated instantaneous trip setting reduces time to contain the arc flash in the electrical circuit.

16. The non-transitory CRM of claim 15, wherein the ERMS activation alert comprises: a first light disposed on a front panel of a switchgear enclosure; and a second light.

17. The non-transitory CRM of claim 16,
   wherein the ERMS activation alert further comprises: an alarm disposed on an annunciator panel and,
   wherein the annunciator panel indicates a status of the electrical circuit.

18. The non-transitory CRM of claim 16, wherein the second light blinks while turned-on.

19. The non-transitory CRM of claim 16, wherein the second light is disposed on the switchgear enclosure at a location selected from a group consisting of: a top portion; and a sidewall.

* * * * *